Patented Dec. 5, 1933

1,938,182

UNITED STATES PATENT OFFICE 1,938,182

TRISAZO DYESTUFF

Henry Jordan, Wilmington, Del., and Harold Edward Woodward, Penns Grove, N. J., assignors to E. I. du Pont de Nemours & Company, Wilmington, Del., a corporation of Delaware No Drawing. Application March 25, 1932
Serial No. 601,286

15 Claims. (Cl. 260—72)

This invention relates to organic compounds and more particularly to dyes, especially of the azo series.

Green azo dyes have been produced in the past but they were all subject to the great disadvantage that they transmitted considerable red light, resulting in a shade which was obviously not a true green. This disadvantage was especially acute in the manufacture of colored films wherein the transmission of red light resulted in a very unsatisfactory green. In addition to this disadvantage the green dyes formerly produced were quite sensitive to light and washing and faded perceptibly when exposed to strong sunlight or vigorous washing.

The object of this invention is to produce a fast bright green azo dye of ready solubility. A further object is to produce a dye which transmits much less of the red end of the spectrum than any green azo color previously known. A still further object is to produce a fast bright dye which will dye silks, wool, leather, stain wood, and which may be used in color photography with far greater success than any green azo dye heretofore known. Additional objects will appear hereinafter.

These objects are accomplished by coupling a diazotized amino-azo compound obtained from an arylamine, which may have substituted thereon the sulfonic acid group and/or other substituents, and 1-amino-2-naphthol-ether-6 (or 7)-sulfonic acid, with a sulfonated-peri-amino-naphthol, diazotizing this amino-disazo dye and coupling with an acidyl acet-arylide, an aryl-alkyl-pyrazolone, or an alkyl ketole. These dyes are of the general type:

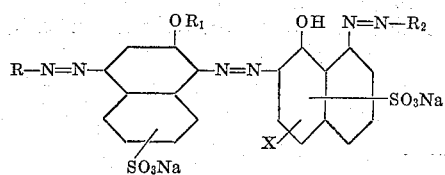

wherein R represents an aryl radical; $R_1$ represents an alkyl or aryl group; $R_2$ represents an aceto-acet-arylide, an aryl-alkyl-pyrazolone, or an alkyl ketole; and X represents hydrogen or a sulfonic acid group.

This invention may be more easily understood by a consideration of the following examples:

*Example I*

Two hundred twenty-three (223) grams of the sodium salt of meta-4-xylidine-5-sulfonic acid was dissolved in 2 liters of water and diazotized at 10° C. by adding 91 grams of hydrochloric acid (100%) and 69 grams of sodium nitrite. The excess hydrochloric acid was neutralized with 82 grams of sodium acetate crystals. To this diazo compound was added a neutral solution of 253 grams of 1-amino-2-naphthol-methyl-ether-6-sulfonic acid and 40 grams of sodium hydroxide in 4 liters of water. After stirring two or three hours at 20° C. the coupling was finished. This amino-azo compound was then diazotized at 15–20° C. by adding 73 grams of hydrochloric acid (100%) and 76 grams of sodium nitrite and stirring one hour. The brown solution of the diazo compound was cooled to 0° and run under the surface of a well-agitated solution of 341 grams of the monosodium salt of 1-amino-8-naphthol-3:6-disulfonic acid (H-acid) and 170 grams of ammonia ($NH_3$) in one liter of water at 0° C. The solution was then heated to 75° C. and the blue dye salted out with 30% of salt and filtered off. The filter cake was washed well with brine and then redissolved in 5 liters of water at 40° C. The base was then diazotized at 20° C. by adding 162 grams of hydrochloric acid (100%) and 52 grams of sodium nitrite. After stirring one-half hour at 20° C. the partly soluble green diazo compound was added to a solution of 133 grams of aceto-acet-anilide and 30 grams of sodium hydroxide and 318 grams of sodium carbonate in 4 liters of water. The temperature was kept at 0° C. during the addition of the diazo. When the coupling was complete the solution was heated to 90° C. and the green dye salted out by adding 15% salt. It was then filtered and dried. This dye had a good solubility in water in neutral or slightly acid solutions. It dyed wool or pure silk a bright green of good fastness properties, and was used for coloring gelatin film with exceptionally good results.
The following formula represents its probable constitution:

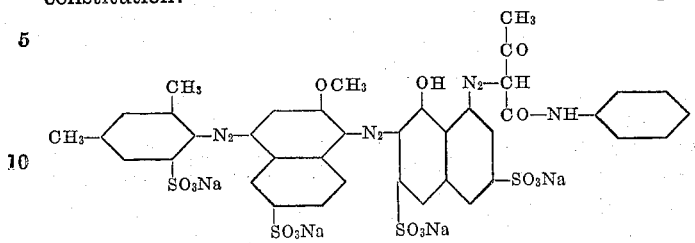

The sodium atoms attached to the sulfonic acid radicals may be replaced by the di-ary-guanidine nucleus and similar bases when an alcohol-soluble product is desired. The product thereby produced is very valuable for use in lacquers, wood-staining, and the dyeing of leather.

Example II

If in the above Example I, 190 grams of 1-para-sulfo-phenyl-3-methyl-5-pyrazolone was used in place of 133 grams of aceto-acetanilide a dye of similar properties was obtained. Its probable constitution may be represented by the formula:

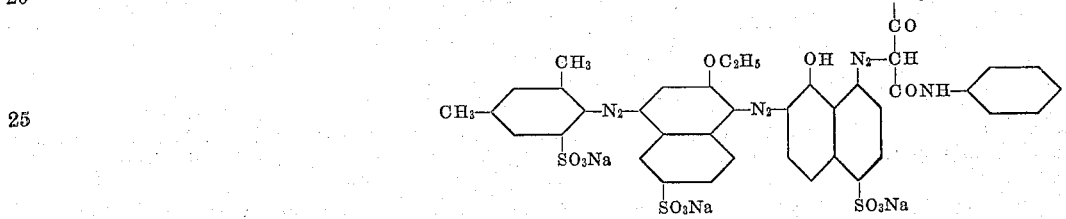

Example III

If in Example I, 230 grams of 4-acetyl-amino-aniline-2-sulfonic acid + 40 grams of sodium hydroxide was used in place of 223 grams of the sodium salt of meta-4-xylidine-5-sulfonic acid a yellower and brighter color of similar properties was obtained. On account of its saturation and brilliance this was probably the most desirable of known azo dyes for a green color filter. The following formula represents its probable constitution:

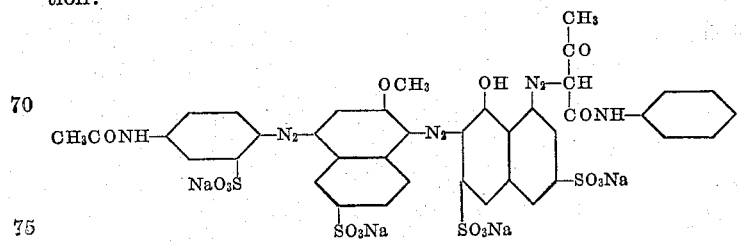

Example IV

If in Example I, 239 grams of S-acid (1-amino-8-naphthol-4-sulfonic acid) was used in place of 341 grams of H-acid and 267 grams of 1-amino-2-naphthol-ethyl-ether-6-sulfonic acid was used in place of 253 grams of the corresponding methyl ether a dye of similar shade was obtained. The following graphical formula is a representation of its probable constitution:

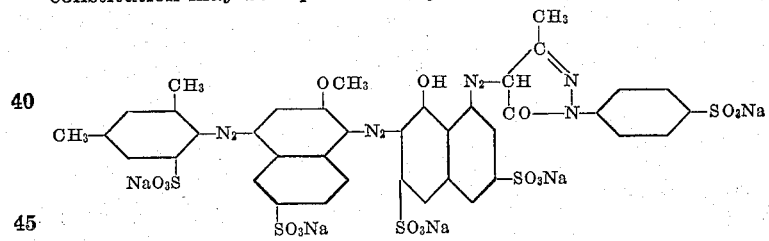

Example V

If in Example I, 245 grams of the sodium salt of naphthionic acid was used in place of 223 grams of the sodium salt of meta-4-xylidine-5-sulfonic acid a dye was obtained which gave much yellower shades on silk. It was yellower and slightly duller than that given in Example III. Its probable constitution may be shown by the following graphical formula:

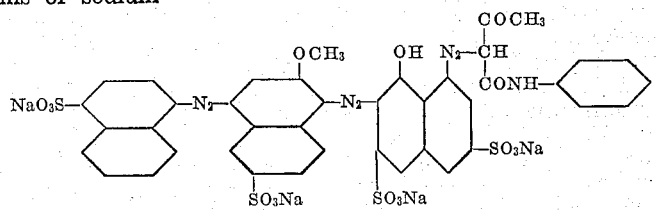

In place of the first intermediate in the above examples, namely, meta-4-xylidine-5-sulfonic acid, 4-acetyl-amino-aniline-2-sulfonic acid and sodium naphthionate, aniline-disulfonic acid and other arylamine disulfonic acids may be used with equally satisfactory results. Carboxylic acid groups may be substituted for the sulfonic acid groups without impairing the advantages of the product. Unsulfonated or uncarboxylated arylamines may also be used when desired.

The second component may be either 1-amino-2-naphthol-methyl-ether-6-sulfonic acid or 1-amino-2-naphthol-ethyl-ether-6-sulfonic acid. Other alkyl or aryl ethers may be used in place of the methyl and ethyl ethers mentioned, with comparable results. Also, the results produced when 7-sulfonic acid is used are quite similar to those produced when 6-sulfonic acid is used.

The third intermediate may be 1-amino-8-naphthol-4-sulfonic acid, 1-amino-8-naphthol-2:4-disulfonic acid, 1-amino-8-naphthol-3:6-disulfonic acid, or 1-amino-8-naphthol-4:6-disulfonic acid, and other peri-amino-naphthol- mono or difulfonic acids.

The fourth intermediate may be aceto-acet-anilide, aceto-acet-ortho-anisidide, aceto-acet-ortho-chloroanilide, 1-phenyl-3-methyl-5-pyrazolone, 1-para-sulfo-phenyl-3-methyl-5-pyrazolone, or 1-ortho-chloro-meta-sulfo-phenyl-3-methyl-5-pyrazolone. In addition to the aforementioned, the other aceto-acet arylides and aryl alkyl pyrazolones may be used, as well as the members of the alkyl ketole group.

The product of the present invention has been found very desirable for dyeing gelatin film to be used in colored photography and also for dyeing silk, wool, leather, and other material where a brilliant shade of fast green is required. It gives very satisfactory results as a wood stain. In addition, the number of equivalents which may be used for the various intermediates is so large that there are always readily available intermediates which may be used. This, obviously, is a tremendous advantage from a commercial standpoint.

As many apparently widely different embodiments of this invention may be made without departing from the spirit and scope thereof, it is to be understood that we do not limit ourselves to the specific embodiments thereof except as defined in the appended claims.

We claim:

1. The process of producing a trisazo dye comprising diazotizing an arylamine and coupling it to a 1-amino-2-naphthol-ether-sulfonic acid, diazotizing this aminoazo compound and coupling it to a sulfonated-peri-amino-naphthol, diazotizing and coupling this amino-disazo compound to a member selected from the group consisting of aceto-acet-arylides, aryl-alkyl-pyrazolones, and alkyl ketoles.

2. The process of producing a trisazo dye comprising diazotizing an arylamine sulfonic acid and coupling it to 1-amino-2-naphtholalkyl-ether-sulfonic acid, diazotizing this amino-azo compound and coupling it to a sulfonated-peri-amino-naphthol, diazotizing and coupling this amino-disazo compound to a compound selected from the group consisting of aceto-acet-arylides, aryl alkyl pyrazolones, and alkyl ketoles.

3. The process of producing a trisazo dye comprising diazotizing an arylamine sulfonic acid, selected from the group consisting of benzene and naphthylene compounds, and coupling it to 1-amino-2-naphtholalkyl-ether-sulfonic acid, diazotizing this amino-azo compound and coupling it to a sulfonated-peri-amino-naphthol, diazotizing and coupling this amino-disazo compound to an aceto-acet-arylide.

4. The process of producing trisazo dyes comprising diazotizing m-4-xylidine-5-sulfonic acid and coupling it to 1-amino-2-naphthol-methyl-ether-6-sulfonic acid, diazotizing this amino-azo compound and coupling it to 1-amino-8-naphthol-3:6-disulfonic acid, diazotizing and coupling this amino-disazo compound to aceto-acet-anilide.

5. The process of producing trisazo dyes comprising diazotizing 4-acetyl-amino-aniline-2-sulfonic acid and coupling it to 1-amino-2-naphthol-methyl-ether-6-sulfonic acid, diazotizing this amino-azo compound and coupling it to 1-amino-8-naphthol-3:6-disulfonic acid, diazotizing and coupling this amino-disazo compound to aceto-acet-anilide.

6. The process of producing a trisazo dye comprising diazotizing an arylamine sulfonic acid, selected from the group consisting of benzene and naphthalene compounds, and coupling it to 1-amino-2-naphthol-alkylether-sulfonic acid, diazotizing this amino-azo compound and coupling it to a sulfonated-peri-amino-naphthol, diazotizing and coupling this amino-disazo compound to an aryl-alkyl-pyrazolone.

7. The process of producing trisazo dyes comprising diazotizing m-4-xylidine-5-sulfonic acid and coupling it to 1-amino-2-naphthol-methyl-ether-6-sulfonic acid, diazotizing this amino-azo compound and coupling it to 1-amino-8-naphthol-3:6-disulfonic acid, diazotizing and coupling this amino-disazo compound to 1-para-sulfo-phenyl-3-methyl-5-pyrazolone.

8. A trisazo dye having the following general formula:

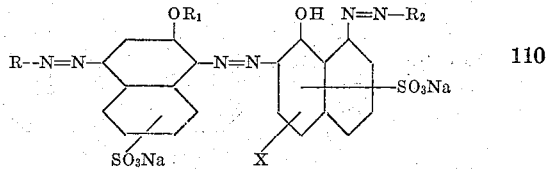

wherein R represents an aryl radical; R₁ represents an alkyl or aryl group; R₂ represents an acetoacet-arylide, an aryl-alkyl-pyrazolone, or an alkyl ketole; and X represents hydrogen or a sulfonic acid group.

9. A trisazo dye having the following general formula:

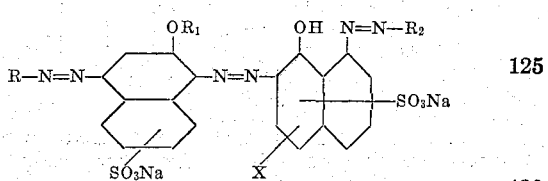

wherein R represents an aryl sulfonic acid radical; R₁ represents an alkyl group; R₂ represents an aceto-acet-arylide, an aryl-alkyl-pyrazolone, or an alkyl ketole; and X represents hydrogen or a sulfonic acid group.

10. A trisazo dye having the following general formula:

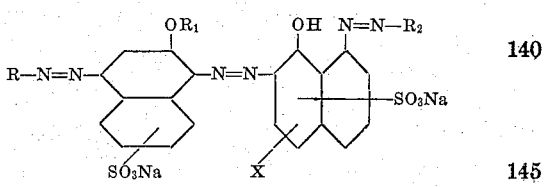

wherein R represents an aryl sulfonic acid radical; R₁ represents an alkyl group; R₂ represents an aceto-acet-arylide; and X represents hydrogen or a sulfonic acid group.

11. A trisazo dye having the following general formula:

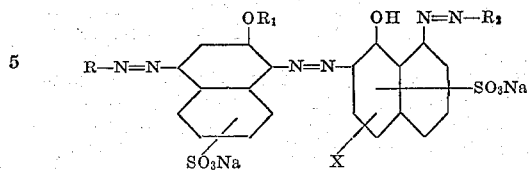

wherein R represents an aryl sulfonic acid radical; $R_1$ represents an alkyl group; $R_2$ represents an aryl-alkyl-pyrazolone; and X represents hydrogen or a sulfonic acid group.

12. A trisazo dye having the following probable formula:

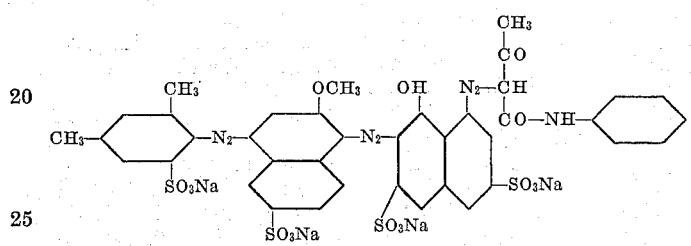

13. A trisazo dye having the following probable formula:

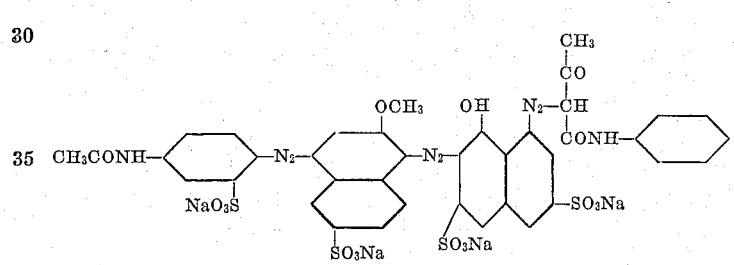

14. A trisazo dye having the following probable formula:

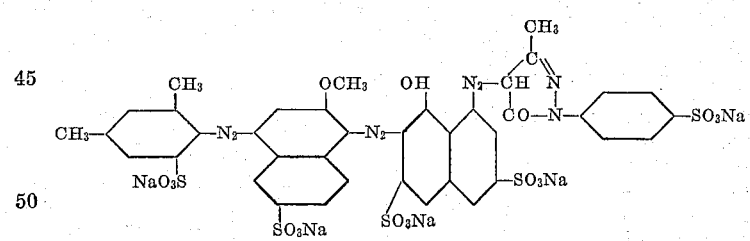

15. A trisazo dye having as intermediate components a member selected from the group consisting of 1-amino-2-naphthol-alkyl-ether-6-sulfonic acid and 1-amino-2-naphthol-alkyl-ether-7-sulfonic acid, and a member selected from the group consisting of peri-amino-naphthol-monosulfonic acid and peri-amino-naphthol-disulfonic acid.

HENRY JORDAN.
HAROLD E. WOODWARD.